(12) United States Patent
Sinibaldi et al.

(10) Patent No.: US 10,491,743 B2
(45) Date of Patent: *Nov. 26, 2019

(54) ADMINISTRATOR-MANAGED SMARTPHONE APPLICATION ACCESS

(71) Applicant: SinSep Designs, LLC, Birmingham, AL (US)

(72) Inventors: Peter Sinibaldi, New Port Richey, FL (US); Chad J. Sepulvado, Indian Springs, AL (US); David Anderson, Fort Myers Beach, FL (US)

(73) Assignee: SinSep Designs, LLC, Birmingham, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,243

(22) Filed: Jul. 31, 2018

(65) Prior Publication Data
US 2019/0109940 A1    Apr. 11, 2019

Related U.S. Application Data

(63) Continuation of application No. 15/725,570, filed on Oct. 5, 2017, now Pat. No. 10,063,688.

(51) Int. Cl.
*H04W 40/24* (2009.01)
*H04M 1/725* (2006.01)
(Continued)

(52) U.S. Cl.
CPC ......... *H04M 1/72577* (2013.01); *H04W 4/14* (2013.01); *H04L 67/10* (2013.01);
(Continued)

(58) Field of Classification Search
CPC . G06F 8/60; G06F 9/5011; G06F 8/34; G06F 9/542; G06F 8/65; H04L 41/0843;
(Continued)

(56) References Cited

U.S. PATENT DOCUMENTS 9,369,537 B1    6/2016    Mathew et al.
9,628,958 B1    4/2017    McBurney
(Continued)

FOREIGN PATENT DOCUMENTS

EP      2 953 332 A1    12/2015

OTHER PUBLICATIONS

PCT/US2018/054350 received an International Search Report and Written Opinion dated Nov. 29, 2018, 13 pages.
(Continued)

*Primary Examiner* — Phuoc H Doan
(74) *Attorney, Agent, or Firm* — Kilpatrick Townsend & Stockton LLP

(57) ABSTRACT

Described herein are methods and systems for limiting functionality of a smartphone by an administrator device based on the speed of the smartphone, which can indicate that the smartphone owner is driving. In some embodiments, the smartphone can be configured to launch a blocking application as the default home screen application. The blocking application can be used to pair the smartphone to the administrator device. The smartphone can receive a velocity threshold and an allowed application list from the administrator device. The smartphone can determine that the velocity of the smartphone, based on GPS data, exceeds the velocity threshold. The blocking application can enable a block mode on the smartphone in response to determining that the velocity exceeds the velocity threshold. Enabling the block mode can include disabling access to applications that are not in the allowed application list, thereby limiting distractions caused by the smartphone for the driver.

15 Claims, 10 Drawing Sheets

(51) Int. Cl.
*H04W 4/14* (2009.01)
*H04W 4/02* (2018.01)
*H04W 4/029* (2018.01)
*H04L 29/08* (2006.01)
*H04W 4/50* (2018.01)

(52) U.S. Cl.
CPC ....... *H04L 67/125* (2013.01); *H04M 1/72569* (2013.01); *H04M 1/72572* (2013.01); *H04W 4/027* (2013.01); *H04W 4/029* (2018.02); *H04W 4/50* (2018.02)

(58) Field of Classification Search
CPC ..... H04L 41/5045; H04L 67/00; H04L 67/10; H04L 63/20; G06Q 10/10
USPC ..... 455/414.1, 419, 422.1; 726/30; 709/223; 342/350
See application file for complete search history.

(56) References Cited

U.S. PATENT DOCUMENTS

| | | |
|---|---|---|
| 10,063,688 B1 | 8/2018 | Sinibaldi et al. |
| 2003/0093534 A1 | 5/2003 | Hartmann et al. |
| 2003/0146929 A1 | 8/2003 | Baldwin et al. |
| 2004/0162063 A1 | 8/2004 | Quinones |
| 2009/0138949 A1 | 5/2009 | O'Neill |
| 2014/0146074 A1 | 5/2014 | Kwon |
| 2015/0079967 A1* | 3/2015 | Mullins ................. H04W 48/04 455/419 |
| 2017/0341962 A1 | 5/2017 | Britt et al. |
| 2019/0014205 A1* | 1/2019 | Miloseski ......... H04M 1/72566 |

OTHER PUBLICATIONS

U.S. Appl. No. 15/725,570 received a Notice of Allowance dated Apr. 26, 2018. 9 pages.

* cited by examiner

200

| |
|---|
| ▼ Administrator Device 1 202 |
| ▼ Administrator Account 1 204 |
| ▼ Client Device 1 206 |
| Name 208 |
| Email 210 |
| Phone Number 212 |
| Device Type 214 |
| ▼ Configuration Settings 216 |
| Headset Allowed 218 |
| Threshold Velocity 220 |
| Idle Deactivation Time 222 |
| Override Mode Time 224 |
| Too Fast Speed 226 |
| Allowed Applications list 228 |
| Allowed Contacts list 230 |
| ▶ Client Device 2 232 |
| ⋮ |
| ▶ Client Device N 234 |
| ▶ Administrator Account 2 236 |
| ⋮ |
| ▶ Administrator Account N 238 |
| ▶ Administrator Device 2 240 |
| ⋮ |
| ▶ Administrator Device N 242 |

FIG. 2

ADMINISTRATOR-MANAGED SMARTPHONE APPLICATION ACCESS

CROSS-REFERENCE TO RELATED APPLICATIONS

This application is a continuation of and claims the benefit of U.S. patent application Ser. No. 15/725,570, filed Oct. 5, 2017, entitled "ADMINISTRATOR-MANAGED SMARTPHONE APPLICATION ACCESS," of which is assigned to the assignee hereof, and which is incorporated in its entirety by reference for all purposes.

BACKGROUND

Mobile devices have become prevalent, with approximately 90% of all U.S. teens owning a smartphone and approximately 98% of all young adults in the U.S. owning a smartphone. With the increased smartphone usage comes an enormous increase in distracted driving. In 2016, more than 330,000 accidents were caused by texting while driving that led to severe injuries. Drivers of all experience levels are susceptible to distracted driving and the potentially serious consequences. Despite the risks, an astounding number of people continue to drive while texting and/or using their mobile devices in some way. Accordingly, improved systems and methods are needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for limiting functionality of a client mobile device by an administrator device. The default application that is launched when the client mobile device is powered on or the home screen button on a client mobile device is selected can be configured as a blocking application. The blocking application can be used to pair the client mobile device to the administrator device over a network. The client mobile device can receive configuration settings from the administrator device including a velocity threshold and an allowed application list. The client mobile device can determine that the velocity of the client mobile device, which can be determined based on global positioning system ("GPS") data, exceeds the velocity threshold. A block mode of the blocking application can be enabled on the client mobile device in response to determining that the velocity exceeds the velocity threshold. Enabling the block mode can include disabling access to applications that are not in the allowed application list. Other embodiments of this aspect include corresponding computer systems, apparatus, and computer programs recorded on one or more computer storage devices, each configured to perform the actions of the methods.

Implementations may include one or more of the following features. Optionally, the block mode can include, for each application installed on the client mobile device that is not in the allowed application list, making an application icon of the application inaccessible by, for example not displaying the application icon in an interface of the client mobile device.

Optionally the configuration settings received from the administrator device can include an allowed contact list, and the block mode can include displaying only contacts in the allowed contact list in a telephone application of the client mobile device. The block mode can include disabling notifications for incoming telephone calls and disabling notifications for each application installed on the client mobile device that is not in the allowed application list.

Optionally, the default texting application parameter of the client mobile device can be configured to the blocking application. The block mode can also include intercepting incoming text messages, storing the incoming text messages while the block mode is enabled, and providing the incoming text messages after the block mode is disabled.

Optionally the configuration settings received from the administrator device can include a threshold disable time value. The client mobile device can disable the block mode in response to determining that the velocity of the client mobile device falls below the velocity threshold for longer than the threshold disable time value.

Optionally, the client mobile device can transmit a list of each application installed on the client mobile device to the administrator device. The administrator device can display the list of installed applications in a user interface of the administrator blocking application on the administrator device for the administrator to use to select the applications to include on the allowed list of applications.

Optionally, the block mode can include providing access to an override mode interface for requesting an override mode on the client mobile device. The override mode interface can include a box for entering a customized message and a request button. The request button can cause the mobile device to transmit an override mode request including the customized message to the administrator device. The administrator device can display the override mode request for approval. After issuing an approval or denial, the administrator device can transmit the response (i.e., the approval or denial) to the client mobile device. The client mobile device can disable the block mode by making applications that are not in the allowed application list accessible on the client mobile device in response to receiving an approval of the override mode request from the administrator device. The client mobile device can maintain the block mode in response to receiving a denial of the override mode request from the administrator device.

The client mobile device can periodically transmit the current velocity of the client mobile device to the administrator device. The administrator device can display a speedometer indicating the current velocity of the client mobile device and a total safe driving distance calculated based on a distance (e.g., miles or kilometers) the client mobile device has traveled in a user interface of the administrator application on the administrator device.

Optionally, the client mobile device can periodically transmit GPS coordinates indicating a location of the client mobile device to the administrator device. The administrator device can display a map of the client mobile device route using the GPS coordinates in a user interface of the administrator application on the administrator device. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates an example data structure for maintaining data in a system for limiting functionality of a client mobile device by an administrator device according to some embodiments.

DETAILED DESCRIPTION

Described herein are systems and methods for limiting functionality of client mobile devices (e.g., smartphones, tablets, smart watches, and so forth) by an administrator device when the mobile device owner is driving. Texting while driving and other distracted driving is becoming a large issue in today's society. For any driver, and particularly for teens and other inexperienced drivers, a text message, phone call, or notification from an application can cause enough distraction to the driver to lead to an accident, which can have immediate and irreversible consequences. For companies with employees that regularly drive on the job (e.g., delivery service companies), the liability associated with an employee driver causing an accident due to distracted driving looms large. To address these issues, described herein are systems and methods for allowing an administrator device to control access to applications and other distractions on a client mobile device based on the velocity (i.e., speed) of the client mobile device.

Embodiments described herein include a client application (also referred to herein as a blocking application) installed on a client mobile device and an administrator application installed on an administrator device. The administrator application can pair with the client application and allow an administrator to provide configuration information to the client application installed on the client mobile device. The configuration information can be used by the client application to manage access to applications and functionality of the mobile device. The client application can monitor the velocity (i.e., speed) of the mobile device based on, for example, global positioning system ("GPS") data. If the speed of the mobile device exceeds a threshold set by the administrator, the client application can enable a block mode. The block mode can limit access to applications based on configurations provided by the administrator. For example, the administrator can configure a list of applications that are allowed while in block mode and a list of contacts that can be called while in block mode. Any applications that are not on the administrator allowed list (e.g., a texting application or a gaming application), are made inaccessible to the mobile device user by the blocking application, and inbound calls or text messages from contacts not on the administrator allowed contact list can be redirected.

Figure 1:
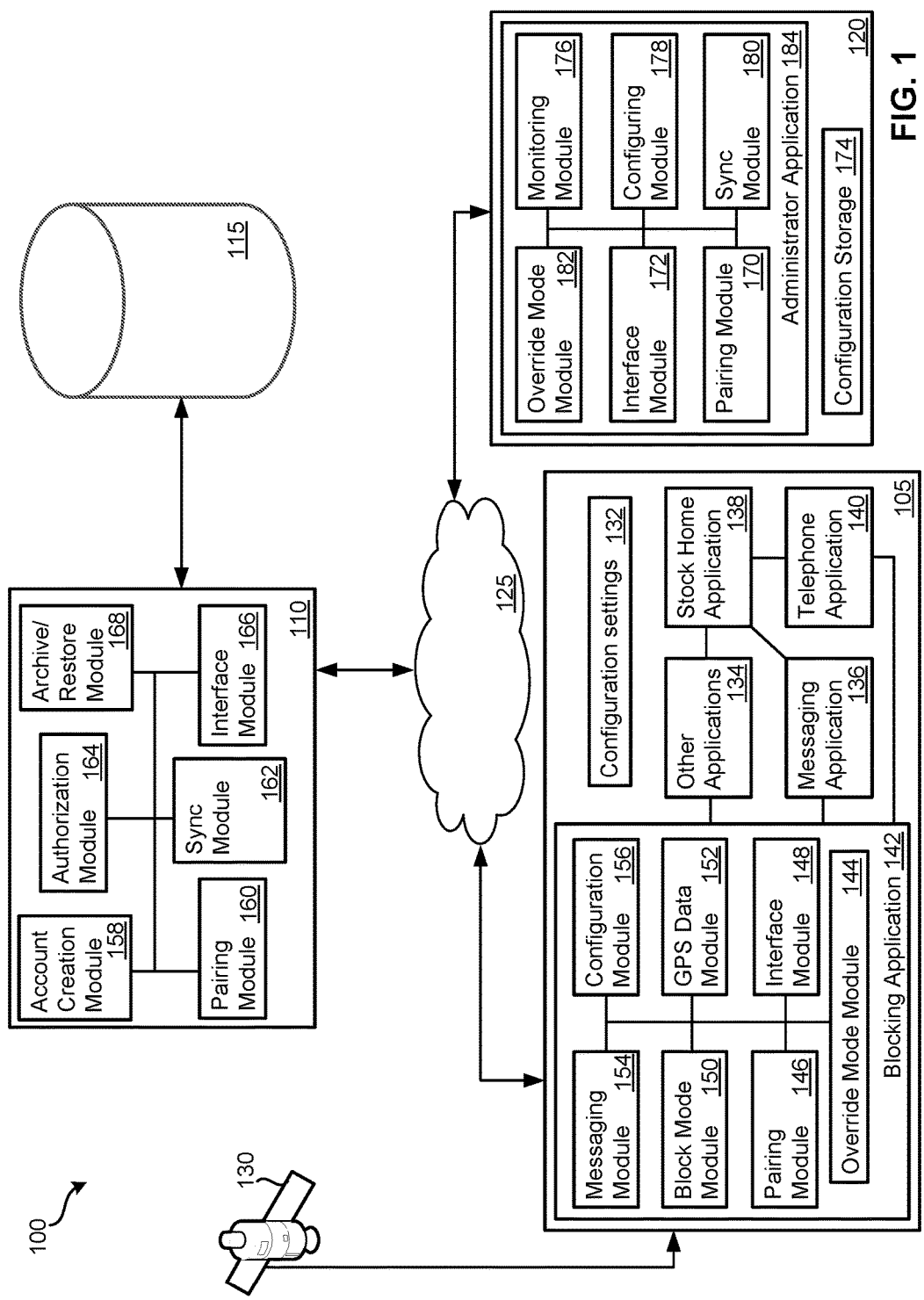
FIG. 1 illustrates an embodiment of a system for limiting functionality of a client mobile device by an administrator device according to some embodiments.

FIG. 1 illustrates a simplified diagram of a system 100 for limiting functionality of a client mobile device by an administrator device. System 100 can include a mobile device 105 (also referred to herein as a monitored device), a server 110, a database 115, an administrator device 120, a network 125, and satellites 130.

Database 115 can be any suitable database for storing data on a back-end, secure database. Database 115 can communicate with server 110 directly, wirelessly, or through any suitable network. Database 115 can store data associated with system 100 including, for example, administrator device 120 data, mobile device 105 data, pairing information, configuration information, and so forth. FIG. 2 describes an example data structure for data that can be stored in database 115.

Network 125, which can include the Internet, may allow for bidirectional communication between any of the devices communicating over network 125. Network 125 can also comprise a cellular network, a local area network, a wide area network, a wireless network, and/or any other suitable network.

Satellites 130 can be satellites orbiting the Earth as part of the GPS system comprising approximately 30 satellites. Satellites 130 regularly broadcast a signal containing position and time data for the satellite 130. Devices on Earth can receive the signals and, using at least three signals from three different satellites 130, can use triangulation to calculate the location of the device on Earth.

Monitored Device/Client Mobile Device

Mobile device 105 can be any suitable mobile device for implementing the methods described herein. Mobile device 105 can be a smartphone, a tablet, a pocket personal computer ("pocket PC"), personal digital assistant ("PDA"), laptop, and so forth. Mobile device 105 can include configuration settings 132, a stock home application 138, a telephone application 136, a messaging application 136, other applications 134, and a blocking application 142. While not depicted for simplicity of the description herein, mobile device 105 can further include one or more memory devices that can include, for example, a working memory, a random access memory ("RAM"), a read only memory ("ROM"), a removable storage device (e.g., a digital versatile disc ("DVD"), compact disc ("CD"), optical disc, and/or flash drive), and so forth. Configuration settings 132, stock home application 138, telephone application 136, messaging application 136, other applications 134, and blocking application 142 can be comprised of computer implemented instructions that are stored, for example on the memory device. Also not depicted can be various other hardware and software components of mobile device 105 such as, for example, one or more communication interfaces, one or more processors, one or more speakers, one or more microphones, one or more cameras, an operating system, a GPS receiver within the mobile device 105, a display, and so forth. While only one mobile device 105 is depicted in system 100, there can be any number of mobile devices 105 in system 100. The mobile device 105 can operate independently of the administrator device 120 such that the administrator device 120 may not be powered on or connected to the network 125 while the mobile device 105 is in use.

Configuration settings 132 can be stored in a memory of mobile device 105. The configuration settings 132 can include, for example, configuration settings for the operating system executing on mobile device 105 and for applications installed on mobile device 105. Many configuration settings are given a default value upon installation. For example, installation of an operating system on mobile device 105 can set a default application for launching when the home button is selected (i.e., the home screen application). Default applications can also be configured for other typical functionality of a mobile device such as, for example, a messaging application (e.g., texting application), a telephony application, an email application, a browser application, and so forth. Configuration settings 132 can also include specific configuration settings for a given application. For example, configuration settings 132 can include the notification sound to be played when a text message arrives in the messaging application. Configuration settings 132 can also include the configuration settings for the blocking application 142 as described further herein.

Stock home application 138 can be the default application configured upon install of the operating system for the home screen application. Before installation of the blocking application 142, stock home application 138 can be the application launched when the home screen button is selected or pressed on mobile device 105. As the default home screen application, stock home application 138 can also be launched when the mobile device is powered on or unlocked. Stock home application 138 can be configured as the default application in configuration settings 132. The default home screen application causes presentation of a menu of available applications and/or widgets on a mobile device. For example, the home screen application can present an icon for each installed application on the mobile device. Additionally, the home screen application can provide widgets or other controls such as, for example, a weather widget that displays the current weather for a selected location, a search bar for searching the Internet, and/or a calendar widget that displays information (e.g., appointments) for the current day.

Telephone application 140 can be the telephone application configured upon install of the operating system for utilizing telephone capability of the mobile device 105. For example, when mobile device 105 is used to call another telephone, the telephone application 140 can be used to make the telephone call. Telephone application 140 can be responsible for telephony functionality on mobile device 105. The telephone application 140 can additionally store a directory of contacts for the mobile device 105.

Messaging application 136 can be the default application configured upon install of the operating system for utilizing messaging (also referred to herein as texting) functionality of the mobile device 105. The messaging application can use, for example short message service ("SMS"), multimedia message service ("MMS"), or iMessage®. Messaging application 136 can be configured as the default messaging application in configuration settings 132. Before installation of blocking application 142, messaging application 136 can be responsible for messaging (i.e., texting) functionality on mobile device 105.

Blocking application 142 can be installed on mobile device 105 to facilitate limiting functionality of the mobile device by the administrator device 120. Blocking application 142 can include override mode module 144, pairing module 146, block mode module 150, messaging module 154, configuration module 156, GPS data module 152, and interface module 148. While specific modules are described herein for the ease of description, blocking application 142 can include any number of modules. For example, the features of some modules can be combined into a single module and/or more than one module can be used to implement the features of a module.

Pairing module 146 can pair mobile device 105 with administrator device 120. Pairing module 146 can communicate, for example, over network 125 with pairing module 170 on administrator device 120 to pair mobile device 105 to administrator device 120. Optionally, pairing module 146 can communicate over network 125 with pairing module 160 on server 110 to complete the pairing and/or communicate the pairing information to the server 110. Pairing module 146 can communicate with configuration module 156 and interface module 148. Pairing module 146 can be responsible for pairing mobile device 105 with administrator 120 for administration of blocking application 142. Optionally, the blocking application 142 may not enable block mode unless the mobile device 105 is paired with administrator device 120.

Block mode module 150 can enable and disable block mode of blocking application 142 on mobile device 105. Block mode module 150 can read configuration setting 132 and can communicate with messaging module 154, GPS data module 152, interface module 148, and override mode module 144. Block mode module 150 can be responsible for ensuring block mode of the blocking application is enabled and disabled appropriately on mobile device 105 as described further herein Messaging module 154 can provide messaging (i.e., texting) functionality in accordance with configurations of blocking application 142. Messaging module 154 can communicate with configuration module 156, block mode module 150, and interface module 148. Optionally, messaging module 154 can replace messaging application 136 in configuration settings 132 as the default messaging application for mobile device 105 during configuration of blocking application 142 by configuration module 156. Messaging module 154 can be responsible for providing messaging functionality for mobile device 105. Optionally, messaging module 154 can be responsible for providing messaging functionality for mobile device 105 only while block mode is enabled.

Configuration module 156 can configure blocking application 142 upon installation of blocking application 142. Configuration module 156 can also receive administrator configurations from administrator device 120 and use the administrator configurations to further configure blocking application 142 in configuration settings 132 for mobile device 105. Configuration module 156 can be responsible for maintaining the configuration of blocking application 142 on mobile device 105 while in use by the mobile device 105.

GPS data module 152 can receive GPS data from satellites 130 and use the GPS data to calculate the location and velocity of mobile device 105. GPS data module 152 can read configuration settings 132 and communicate with block mode module 150. GPS data module 152 can be responsible for communicating the velocity of mobile device 105 to block mode module 150 as well as communicating the velocity and location of mobile device 105 to administrator device 120.

Interface module 148 can provide a user interface to the user (also referred to herein as the owner or the driver) of mobile device 105. The user interface is described further with respect to FIGS. 5A, 5B, 6A, 6B, 7A, and 7B. Interface module 148 can be responsible for generating and providing the user interface for display on mobile device 105.

Override mode module 144 can request an override mode when block mode is enabled on mobile device 105 based on a request from the user. Override mode module 144 can send the request to administrator device 120 and receive a response to the request. Based on the response, override mode module 144 can override block mode on mobile device 105. Optionally the override mode can be limited by an override period, which can be a time established by administrator device 120. Optionally, the override mode can be limited, for example to specific applications and/or specific contacts. Optionally, if an approval for override mode is received when the mobile device 105 is not in block mode, the mobile device 105 may not enter block mode for the override period.

Telephone module 186 can provide telephony (i.e., phone call) functionality in accordance with configurations of blocking application 142. Telephone module 186 can communicate with configuration module 156, block mode module 150, and interface module 148. Optionally, telephone module 186 can replace telephone application 140 in configuration settings 132 as the default telephone application for mobile device 105 during configuration of blocking application 142 by configuration module 156. Optionally, telephone module 186 can replace telephone application 140 only during block mode by providing the telephony functionality during block mode but leaving the telephone application 140 available to use when block mode is not enabled.

Server

Server 110 can be any suitable server for implementing the server functionality described herein. Server 110 can be a secure, back-end database server. Server 110 can be a rack server, a standalone computer, part of a server farm, a cloud server, or any other suitable server. While only one server 110 is depicted in system 100, there can be any number of servers 110 such as, for example, in a server farm or cloud server architecture. Server 110 can include account creation module 158, pairing module 160, sync module 162, authorization module 164, interface module 166, and archive/restore module 168. While not depicted for simplicity of the description herein, server 110 can further include one or more memory devices that can include, for example, a working memory, a random access memory ("RAM"), a read only memory ("ROM"), a removable storage device (e.g., a digital versatile disc ("DVD"), compact disc ("CD"), optical disc, and/or flash drive), and so forth. Account creation module 158, pairing module 160, sync module 162, authorization module 164, interface module 166, and archive/restore module 168 can be comprised of computer implemented instructions that are stored, for example on the memory device. Also not depicted can be various other hardware and software components of mobile device 105 such as, for example, one or more communication interfaces, one or more processors, an operating system, a display, and so forth. While specific modules are described herein for the ease of description, server 110 can include any number of modules. For example, the features of some modules can be combined into a single module and/or more than one module can be used to implement the features of a module.

Account creation module 158 can create an administrator account for administrator device 120 in system 100 as well as for any other administrator devices. Account creation module 158 can create a client account for mobile device 105 in system 100 as well as for any other mobile devices. Once accounts have been created by account creation module 158, the account data can be stored in database 115.

Pairing module 160 can facilitate paring of mobile device 105 and administrator 120. Optionally, pairing module 160 can relay messages between mobile device 105 and administrator device 120 to complete the pairing process. Optionally, pairing module 160 can receive pairing information once pairing is complete between mobile device 150 and administrator device 120 for storage in database 115.

Authorization Module 164 can provide authentication services for system 100 including, for example, authentication for access to data in database 115, authentication for restoring a mobile device, and/or authentication for archiving a mobile device. Generally, server 110 is a secure server. Accordingly, access to any functionality on server 110 such as accessing data, modifying data, or creating data requires authentication which is handled by authorization module 164.

Sync module 162 can communicate with sync module 180 on administrator device 120 to sync data stored on administrator device 120 with data stored in database 115. Optionally, a copy of the data used for administration of mobile device 105 can be stored on the administrator device 120 and in database 115. Sync module 162 can facilitate ensuring the data stored on the administrator device 120 matches the data stored in database 115 for any given mobile device 105. Further, administrator device 120 can have configuration data that is also stored in database 115 which can be maintained in database 115 by sync module 162.

Interface module 166 can provide a user interface to server 110. Optionally, server 110 may not include interface module 166. Interface module 166 can be responsible for generating and providing the user interface for display on server 110. The user interface can be protected by security features such as username and password and not made available to users other than authorized users and administrators.

Archive/restore module 168 can archive and/or restore an account and any accompanying device data in database 115. For example, if mobile device 105 were to be removed from system 100 (for example because the user no longer wished to allow an administrator to provide configuration data or because an employee was no longer employed by a company requiring administration), archive/restore module 168 can store the data associated with mobile device 105 in database 115 and deactivate mobile device 105 in database 115. If mobile device 105 were then to be re-added to system 100 (for example because the employee was re-hired), archive/restore module 168 can restore mobile device 105 by activating mobile device 105 in database 115 and providing mobile device 105 data to administrator device 120.

Administrator Device

Administrator device 120 can be any suitable device for implementing the methods described herein. Administrator device 120 can be a desktop computer, a smartphone, a tablet, a pocket personal computer ("pocket PC"), personal digital assistant ("PDA"), a laptop, and so forth. Administrator device 120 can include administrator application 184 and configuration storage 174. While not depicted for simplicity of the description herein, administrator device 120 can further include one or more memory devices that can include, for example, a working memory, a random access memory ("RAM"), a read only memory ("ROM"), a removable storage device (e.g., a digital versatile disc ("DVD"), compact disc ("CD"), optical disc, and/or flash drive), and so forth. Administrator application 184 can be comprised of computer implemented instructions that are stored, for example, on the memory device. Also not depicted can be various other hardware and software components of administrator device 120 such as, for example, one or more communication interfaces, one or more processors, one or more speakers, one or more microphones, one or more cameras, an operating system, a GPS receiver, a display, and so forth. While only one administrator device 120 is depicted in system 100, there can be any number of administrator devices 120 in system 100.

Configuration storage 174 can maintain a copy of all the data needed for administrator application 184. For example, configuration storage 174 can maintain a copy of the administrator accounts on the administrator device 120 and information for each mobile device 105 administered by an administrator account on administrator device 120.

Pairing module 170 can pair an administrator account on administrator device 120 with mobile device 105. Pairing module 170 can communicate, for example, over network 125 with pairing module 146 on mobile device 105 to pair mobile device 105 to an administrator account on administrator device 120. Optionally, pairing module 170 can communicate over network 125 with pairing module 160 on server 110 to complete the pairing and/or communicate the pairing information to the server 110. Pairing module 170 can communicate interface module 172 and configuration storage 174. Pairing module 170 can be responsible for pairing mobile device 105 with an administrator account on administrator device 120 for administration of blocking application 142.

Interface module 172 can provide a user interface to the user (also referred to herein as the administrator) of administrator device 120. The user interface is described further with respect to FIGS. 8, 9A, 9B, and 10. Interface module 172 can be responsible for generating and providing the user interface for display on administrator device 120.

Override mode module 182 can receive a request for an override mode whether block mode is enabled or not on mobile device 105 based on a request from the user of mobile device 105. Override mode module 182 can provide a notification to the administrator and receive an approval or denial of the request. Override mode module 182 can then send the response to override mode module 144 mobile device 105. Optionally, if the approval of the override request is received while not in block mode, the mobile device 105 may not enter block mode for the duration of the override period.

Figure 10:
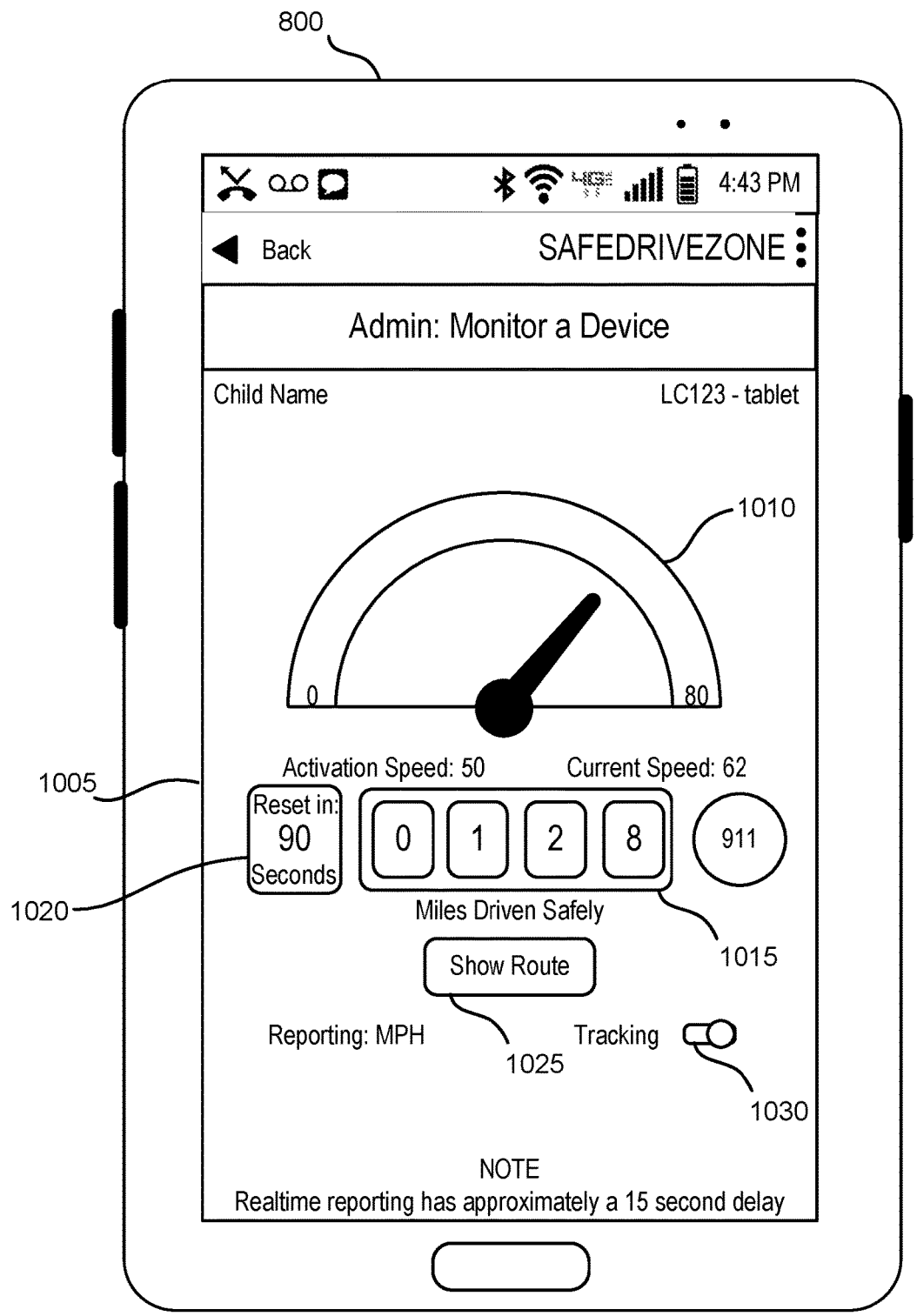

Monitoring module 176 can monitor mobile device 105. For example, monitoring module 176 can receive velocity and/or location data from mobile device 105. Monitoring module 176 can generate and provide visual monitoring data on mobile device 105 to interface module 172 for display in the user interface. For example, a speedometer, a route map, and/or a number of safe miles driven can be provided showing current velocity, location information. FIG. 10 provides an exemplary user interface for display of information from monitoring module 176.

Configuring module 178 can manage the configuration data entered into the user interface for mobile device 105. For example, when configuration data is entered or modified in the user interface for mobile device 105, configuration module 178 can store the updated or new information in configuration storage 174 and mark it for syncing. Optionally, the configuring module 178 can transmit the configuration settings to mobile device 105.

Sync module 180 can identify data stored in configuration storage 174 that is marked for syncing and sync the data with sync module 162 for storage in database 115. Optionally, sync module 180 can transmit configuration data for mobile device 105 that is marked for syncing to configuration module 156 on mobile device 105.

Each of the modules and applications described with respect to server 110, mobile device 105, and/or administrator device 120 can be implemented in, for example, software executed by one or more processors, specialized hardware, firmware, or any other suitable implementation mechanism. Software can be stored on and executed from a computer readable memory including, for example, optical disks, hard disk drives, magnetic disk drives, solid state drives, random access memory ("RAM"), read only memory ("ROM"), flash drives, and so forth.

In use, system 100 can limit functionality of mobile device 105 as configured by administrator device 120 based on a velocity of mobile device 105. An example situation in which system 100 can be implemented includes a parent administering a child's mobile device to ensure the child is not driving distracted. Another example situation includes a corporation (i.e., business or enterprise) administering employee mobile devices to ensure the employees are not driving distracted. Any corporation may find benefit in system 100, including, for example, delivery service companies, bussing or transportation companies, companies with travelling sales teams, and so forth.

Initially, administrator application 184 can be installed on administrator device 120 by, for example, a user of administrator device 120. Blocking application 142 can be installed on mobile device 105 by, for example, a user of mobile device 105. Once the applications are installed, accounts can be created.

Account Creation

Interface module 172 of administrator application 184 can provide a user interface on administrator device 120 for entering data for creating an administrator account. Optionally, multiple administrator accounts can be created on administrator device 120. The administrator account can be created with, for example, an administrator name (e.g., first and last name), an email address for the administrator, a password for the administrator account, and an SMS number for the administrator (e.g., a mobile telephone number). Optionally the administrator account can be a superuser account that allows the administrator account to view all other administrator accounts on the administrator device 120 and/or all administrator accounts stored in database 115 for all administrator devices 120. The administrator account information can be received by interface module 172 and stored in configuration storage 174. The administrator account information can be marked for syncing by interface module 172 when it is stored in configuration storage 174. Sync module 180 can identify the administrator account information that is marked for syncing and transmit the data to sync module 162 on server 110. Sync module 162 can store the administrator account information in database 115, thereby maintaining a copy on the secure, back-end database. Optionally, before sync module 180 can transmit the data to sync module 162, authorization module 164 can authenticate sync module 180 as a trusted source for data.

Optionally, interface module 172 can provide a screen for adding mobile device 105 (e.g., a device account) in the user interface on administrator device 120. The mobile device account can be created with, for example, a device name, an email address for the mobile device user, and an SMS number for the mobile device 105. Optionally the account can include a device type (e.g., smartphone, tablet, and so forth) that identifies the type of the device. Optionally the account can include a threshold velocity value that sets the speed at which mobile device can travel before the block mode is enabled in blocking application 142. Optionally, the account can include an idle deactivation value that sets a time for which the mobile device must be travelling below the threshold velocity value before the block mode is disabled. Optionally, values such as the device type, the threshold velocity value, and the idle deactivation time can have default values provided by the administrator device 120. Optionally, the account can include a too fast velocity that sets a velocity that if mobile device 105 surpasses a notification is provided to the administrator account. Optionally, the account can include an allowed contacts list that specifies contacts that mobile device 105 can access when block mode is enabled and can have any number of entries in the list, including zero. Optionally, the account can include an allowed applications list that specifies applications that mobile device 105 can access when block mode is enabled. The mobile device account information can be received by interface module 172 and stored in configuration storage 174. The mobile device account information can be marked for syncing by interface module 172 when it is stored in configuration storage 174. Sync module 180 can identify the mobile device account information that is marked for syncing and transmit the data to sync module 162 on server 110. Sync module 162 can store the administrator account information in database 115, thereby maintaining a copy on the secure, back-end database. Optionally, before sync module 180 can transmit the data to sync module 162, authorization module 164 can authenticate sync module 180 as a trusted source for data.

Pairing

Once an administrator account has been created and, optionally a mobile device account has been created, the administrator account on administrator device 120 can be paired with mobile device 105. As an example, the administrator device 120 can send an SMS message to mobile device 105 that can contain a custom universal resource locator ("URL"). The link can be accessed on mobile device 105, which can pass an encrypted pairing identifier into pairing module 146 of blocking application 142. Pairing module 146 can initiate a handshake based on the pairing identifier with administrator device 120 to complete the pairing. Pairing module 146 can also store the pairing identifier in configuration settings 132 for blocking application 142. Optionally, if blocking application 142 is not executing on mobile device 105, the custom URL can remote start (i.e., launch) blocking application 142.

Optionally, pairing module 170 on administrator device 120 can pass the pairing information to pairing module 160 on server 110. Pairing module 146 on mobile device 105 can access the pairing information from pairing module 160 to complete the pairing. For example, the pairing module 146 can provide a prompt for display through interface module 148 to the user interface for entering the telephone number of mobile device 105. The user can enter the mobile device 105 telephone number, which can be transmitted to pairing module 160 on server 110, which can match the pairing information provided by pairing module 170 from administrator device 120.

Configuration of Mobile Device Settings

Once mobile device 105 is paired with administrator device 120 (or an administrator account on administrator device 120), configuring module 178 can configure blocking application 142 on mobile device 105. For example, configuring module 178 can pass the configuration settings entered when the mobile device account was created. Optionally, configuration settings were not previously entered and can be entered after pairing. Optionally, additional configuration settings can be sent after pairing or existing configuration settings can be modified after pairing.

Configuration module 156, either before or after pairing, can configure the blocking application 142 to be the default application for the home screen application in configuration settings 132. Stated differently, the home screen application that is launched when the home button on mobile device 105 is selected or when the mobile device 105 is powered on is set to the blocking application 142. As a result of this configuration, the home screen application running on mobile device 105 after the configuration change is blocking application 142. The home screen application on mobile device 105 is responsible for the user interface that provides access to the icons for launching installed applications on mobile device 105. By acting as the home screen application, blocking application can control access to applications by, for example, hiding the icons or not displaying the icons for the applications. Without an icon for selection on by the home screen application, a user has no way to access the application. Additionally, as the home screen application, blocking application 142 can manage installation and deletion of all installed applications and maintain the contacts stored in mobile device 105. Optionally, the blocking application 142 can maintain a first home screen user interface that includes for display icons for all installed applications on mobile device 105. The first home screen user interface can be used by blocking application 142 when block mode is not enabled. Optionally, the blocking application 142 can maintain a second home screen user interface that only includes for display icons for applications included on the allowed applications list. The second home screen user interface can be used by blocking application 142 when block mode is enabled.

Configuration module 156, either before or after pairing, can configure the default messaging application to be messaging module 154. Stated differently, the messaging application that is utilized by default when a text message is received or sent can be configured to be messaging module 154. Optionally, messaging module 154 is a separate application from blocking application 142 that can interface with blocking application 142. As the default messaging application, the messaging module 154 can send, receive, and process all SMS and MMS messages and transactions on mobile device 105. Further, messaging module 154 can manage and process all internal SMS and MMS transactions requested or sent by any other installed application on mobile device 105.

After pairing, installed application information can be collected by configuration module 156 of blocking application 142 for each installed application on mobile device 105. For example, each application's icon and package information can be stored in a zip file and stored in configuration settings 132 for blocking application 142. The zip file can be sent to sync module 162 on server 110 for storage in database 115 and syncing with sync module 180 on administrator device 120. Once administrator device 120 has the installed applications information, the allowed applications list can be generated. Similarly, the contacts information from mobile device 105 can be obtained and included in the zip file or in a different zip file for transmission to sync module 162 for storage in database 115 and syncing with sync module 180 of administrator device 120. Once administrator device 120 has the contacts list the allowed contacts list can be generated.

The allowed contacts list can include a list of people who can be contacted by telephone and/or text messaging and from whom telephone calls and/or text messages can be received on mobile device 105 even while block mode is enabled in blocking application 142. Once the configuring module 178 has the contacts information from mobile device 105, configuring module 178 can provide a user interface screen through interface module 172 that allows the administrator to select contacts from the contacts information to include in the allowed contacts list. Configuring module 178 can receive the selections, generate the allowed contacts list, store the allowed contacts list in configuration storage 174 and mark it for syncing, and transmit the allowed contacts list to configuration module 156 on mobile device 105. Optionally, rather than configuring module 178 on administrator device 120 transmitting the allowed contacts list (or any other information) to mobile device 105, sync module 162 can transmit the allowed contacts list (or any other information that is synced from administrator device 120 regarding mobile device 105) to configuration module 156 on mobile device 105 when sync module 162 syncs the data with database 115.

The allowed applications list can include a list of applications installed on mobile device 105 that remain accessible when block mode is enabled in blocking application 142. Once the configuring module 178 has the installed applications information from mobile device 105, configuring module 178 can provide a user interface screen through interface module 172 that allows the administrator to select applications from the installed applications information to include in the allowed applications list. FIG. 9B illustrates an exemplary user interface. Configuring module 178 can receive the selections, generate the allowed applications list, store the allowed applications list in configuration storage 174 and mark it for syncing, and transmit the allowed applications list to configuration module 156 on mobile device 105.

Because the blocking application 142 is configured to be the default home screen application, the blocking application 142 can manage and be aware of the addition and/or deletion of any installed applications on mobile device 105. Similarly, blocking application 142 can manage and be aware of the addition and/or deletion of any contacts on mobile device 105. If there are changes to the installed applications or contacts on mobile device 105, configuration module 156 can send an updated contacts list and/or an updated installed applications list to sync module 162 on server 110 for syncing with database 115 and on administrator device 120. Sync module 180 on administrator device can receive the modifications and store them in configuration storage 174. The new configuration information can be used in the user interface of the administrator application 184 to modify the allowed applications list and/or the allowed contacts list. Optionally, blocking application 142 can administer the installation, deletion, and management of installed applications on mobile device 105.

Implementing the Configurations on the Mobile Device

Once mobile device 105 has the configurations for blocking application 142 stored in configuration settings 132, blocking application 142 can implement the configurations. While the mobile device is not travelling faster than the threshold velocity, the blocking application can allow access to all installed applications and all contacts on mobile device 105, and messaging module 154 can provide uninterrupted messaging services to mobile device 105.

GPS data module 152 can periodically obtain GPS data from satellites 130 to calculate a location and velocity of mobile device 105. For example, by obtaining the broadcasted position and time information from at least three satellites 130, GPS data module 152 can calculate a position of mobile device 105 using trilateration. GPS data module 152 can periodically calculate the position and, based on a difference in time and position, calculate the velocity of mobile device 105. GPS data module 152 can use the configured threshold velocity value from administrator device 120 to notify block mode module 150 when the velocity of mobile device 105 exceeds the threshold velocity value. If the velocity of mobile device 105 exceeds, for example, 25 miles per hour (an example threshold velocity value), it can be reasonable to assume that mobile device 105 is travelling in a vehicle. It can be further reasonable to assume that the user of mobile device 105 is driving the vehicle.

Based on receiving the notification from GPS data module 152, block mode module 150 can enable block mode in blocking application 142 on mobile device 105. Block mode can include phone redirection. For example, block mode can redirect all incoming telephone calls directly to, for example, voicemail. Incoming telephone calls from contacts that are on the allowed contacts list can be passed through to the telephone application 140. Optionally, a text message can be sent to the caller for redirected calls providing a message that the user is driving. Optionally, the message can be customized. Calls that are redirected can be included in a list that is stored and provided in a user interface of the blocking application 142 after block mode is disabled. The list that is stored can be used after block mode is disabled as a callback list. Outbound telephone calls can be made to only contacts on the allowed list of contacts while block mode is enabled. Optionally, a headset configuration option can be set by the administrator so that if a wireless (e.g., Bluetooth®) headset or wired headset is connected to mobile device 105, call redirection can be overridden. Stated differently, if the administrator allows headset calls, and a headset is connected to mobile device 105, block mode can allow incoming and outgoing calls to and from all contacts on mobile device 105. Optionally, calls to 911 can be allowed whether block mode is enabled or not.

Block mode can include messaging (e.g., SMS or MMS) redirection. For example, incoming text messages can be stored as normal in the mobile device 105 storage. The notifications for the incoming text messages can be disabled so that the user is not aware of the incoming text message. A list of incoming messages can be stored and provided in the user interface of the blocking application 142 after block mode is disabled. Once block mode is disabled, the text messages that came in during block mode can be available in the messaging module 154 as normal.

Block mode can include application blocking. For example, applications that are not on the allowed applications list can be inaccessible in the blocking application 142. For example, the applications that are not on the allowed applications list can be ineligible for selection from the blocking application (i.e., the home screen). Optionally, the icons for applications that are not on the allowed applications list can be hidden. By not providing the icon for launching an application, the blocking application 142 can effectively block usage of the application because without a way to launch the application, the user cannot use it. Optionally, the home screen displayed during block mode is a different home screen than the one displayed when block mode is not enabled. The difference can be that when block mode is enabled, the home screen can include only application icons for applications on the allowed applications list and when block mode is not enabled, the home screen can include application icons for all installed applications.

Optionally, block mode can further include turning off notifications for all applications not on the allowed application list.

GPS data module 152 can continue to calculate position and velocity information for mobile device 105. GPS data module can use the threshold velocity value and the idle deactivation value to determine when mobile device 105 falls below the threshold velocity value for a period of time greater than the idle deactivation value. The idle deactivation value can be a period of time sufficient to assume that the user is no longer driving. For example, if the idle deactivation value is too low (e.g, 20 seconds), stopping at a red light may be sufficiently long to cause the GPS module to determine that the velocity of mobile device 105 fell below the threshold velocity value for longer than the idle deactivation time even though the user is still driving. Once the GPS data module determines that the velocity of mobile device 105 falls below the threshold velocity value for longer than the idle deactivation value, the GPS data module send a disable notification to the block mode module 150. In response to receiving the disable notification from the GPS data module, the block mode module 150 can disable block mode.

Disabling block mode can include restoring access to all installed applications by the blocking application 142. For example, the home screen can display the icons for all installed applications. Disabling block mode can also include restoring notifications for all installed devices. Disabling block mode can also include restoring access to all contacts on the mobile device 105.

Optionally, an override mode can be requested by override mode module 144 when block mode is enabled in blocking application 142. For example, override mode module 144 can provide a screen in the user interface of blocking application 142 that can allow the user to request override mode. Override mode can be appropriate when, for example, the user of mobile device 105 is a passenger and not the driver. Override mode can temporarily override block mode. Override mode module can receive a request for override mode from the user interface that can include, for example, a custom message. Override mode module can send the custom message and request to override mode module 182 on administrator device 120. Override mode module 182 can provide a notification to the administrator through, for example, the user interface of administrator application 184. The administrator can provide a response either approving or denying the override mode. Override mode module 182 can transmit the response to override mode module 144 on mobile device 105. If the response is a denial, override mode module 144 can, for example, display a denial notification in the user interface of blocking application 142.

Optionally, override mode module 144 can send a notification to block mode module 150 to disable block mode if the response is an approval. Optionally, override mode module 144 can send a notification to block mode module 150 to enable an override mode. Override mode can, for example, provide more functionality (e.g., additional applications) than block mode without providing access to all installed applications and functionality of mobile device 105. Optionally, override mode can disable block mode restoring full functionality of mobile device 105. Optionally, the override mode (or disabling of block mode) can be temporary in response to an approval for override mode. For example, administrator device can configure an override mode time when configuring blocking application 142. Optionally, the approval of override mode can include a time period for override mode. Optionally, if override mode is enabled and the velocity of mobile device 105 falls below the threshold velocity value for the idle deactivation time, override mode and block mode can be disabled.

Monitoring the Mobile Device on the Administrator Device

The user interface of administrator application 184 can include a screen provided from monitoring module 176 for monitoring mobile device 105. FIG. 10 illustrates an example interface. Monitoring module 176 can periodically receive velocity and location data for mobile device 105 from GPS data module 152. The velocity and location data can be used by monitoring module 176 to provide a user interface screen that displays the current velocity of mobile device 105 and a route that mobile device 105 has travelled. Monitoring module 176 can store the velocity and location data in configuration storage 174. Optionally, the velocity and position of mobile device 105 can be sent from GPS data module 152 to server 110 for storage in database 115. Sync module 162 can sync the data through sync module 180 on administrator device 120.

Optionally, monitoring module 176 can use stored velocity and location information from mobile device 105 to replay a route for display in the user interface of administrator application 184. The replay feature can also display velocity information for mobile device 105 over a tracked period.

Configuring Settings of the Administrator Device

Configuring module 178 can also provide a user interface screen in administrator application 184 that allows the administrator to configure settings for administrator application 184. For example, a notifications setting can be received and stored in configuration storage 174 that allows popup notifications and sounds in administrator application 184. Optionally, a store notifications setting can cause administrator application 184 to store all notifications in configuration storage 174. Optionally, a units configuration can be set to set and see velocity values as metric (kilometers per hour) or standard (miles per hour). Optionally, a sample rate setting can be set to configure the interval at which GPS coordinates are sampled.

Example Data Hierarchy/Structure

FIG. 2 illustrates an example data hierarchy 200 for data stored in a system database, for example database 115 of FIG. 1. The data hierarchy 200 is an exemplary structure, and other structures are possible. Portions of the data structure can be stored on, for example, the administrator device and/or the client device. The data hierarchy 200 can be one example of a data structure used to manage rules associated with the system including, for example, which administrator device and/or administrator account administers which client device.

There can be multiple (any number of) administrator devices 202, 240, 242. Each administrator device 202, 240, 242 can have multiple (any number of) administrator accounts 204, 236, 238 configured on it. Each administrator account can be configured to administer multiple (any number of) client devices 206, 232, 234 (i.e., mobile devices or monitored devices). Each client device 206, 232, 234 can have identifying information including a name 208, an email address 210 for the client device's owner or user, a phone number 212 for the client device, and a device type 214 (e.g., phone, tablet, and so forth). Each client device 206, 232, 234 can also include configuration settings 216 including, for example, headset allowed 218, which can allow the above discussed headset override during block mode. Configuration settings 216 can include a threshold velocity 220, which can determine the velocity at which the client device 206, 232, 234 can travel before block mode is enabled. Configuration settings 216 can include an idle deactivation time 222, which can determine the period of time for which the velocity of client device 206, 232, 234 must fall below the threshold velocity 220 before block mode is disabled. Configuration settings 216 can include an override mode time 224, which can determine how long override mode can be enabled after a request and approval for override mode as described above. Configuration settings 216 can include a too fast speed 226, which can determine a velocity over which the client device travels that is considered too fast by the administrator. Driving over the too fast speed 226, even with block mode enabled, may not add to the safe driving distance of the driver. Configuration settings 216 can include an allowed applications list 228 as discussed above for use during block mode. Configuration settings 216 can include an allowed contacts list 230 as discussed above for use during block mode.

Example Use Cases

Figure 3:
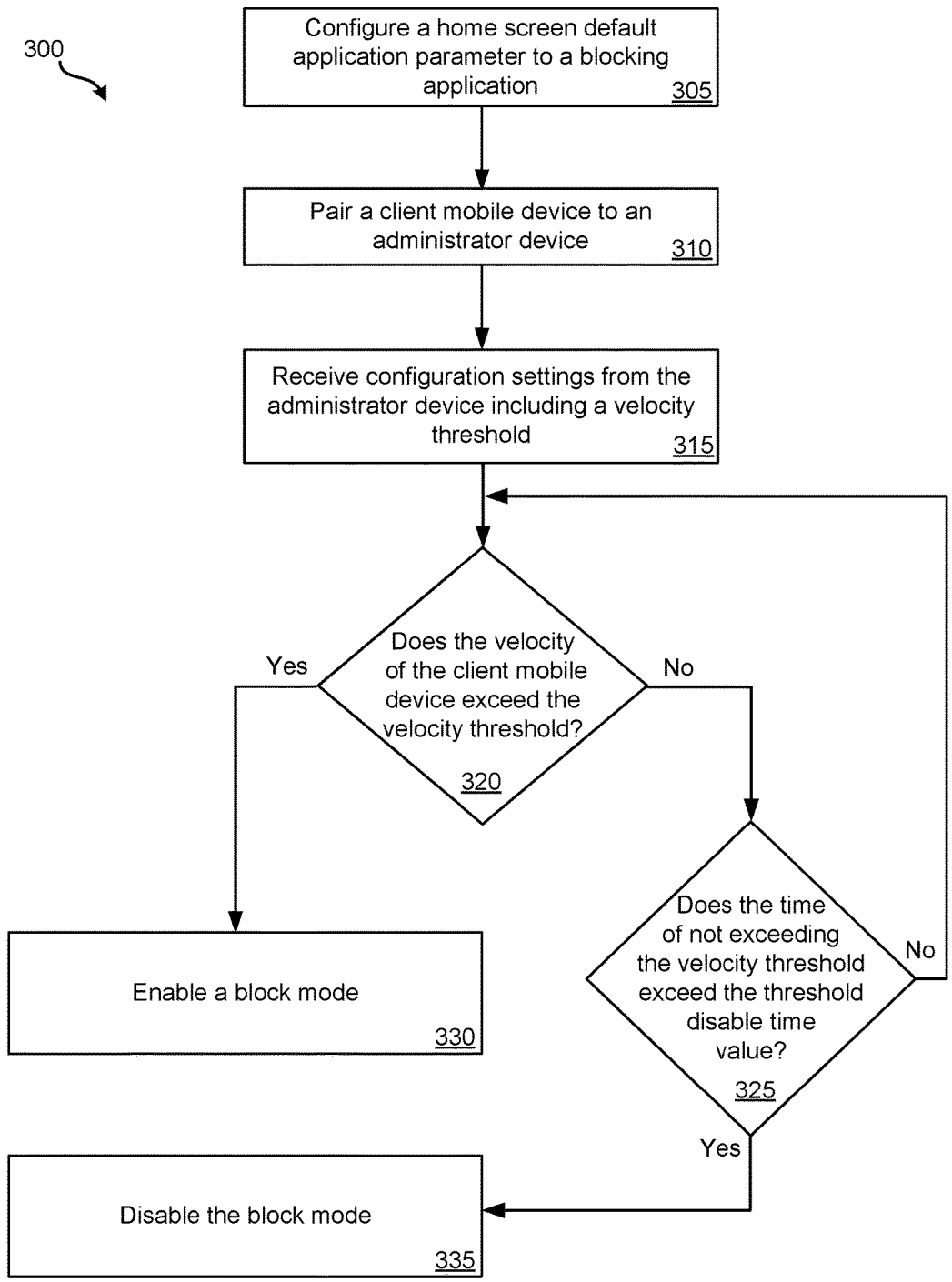
FIGS. 3 and 4 illustrate process flows for limiting functionality of a client mobile device by an administrator device according to some embodiments.

FIG. 3 illustrates a process flow 300 for limiting functionality of a mobile device by an administrator device. Process flow 300 can be performed by, for example, system 100 of FIG. 1. Optionally, the administrator using the administrator device can be a parent administering a child's client device. Optionally, the administrator using the administrator device can be an employer administering an employee's client device. The home screen default application can be configured to be a blocking application (e.g., blocking application 142) on the mobile device (e.g., mobile device 105) at 305. For example, after installing the blocking application, a configuration module (e.g., configuration module 156) can modify the configuration settings (e.g., configuration settings 132) to set the default home screen application to the blocking application.

At step 310, the mobile device and administrator device (e.g., administrator device 120) can be paired. The mobile device and administrator device can be paired by, for example, pairing modules 146 and 170 as described with respect to FIG. 1.

At step 315, the mobile device can receive configuration settings from the administrator device including a velocity threshold. The configuration settings can optionally include additional configuration settings such as, for example, an allowed contacts list, an allowed applications list, whether calls are allowed with a headset, an idle deactivation time, an override mode time, and a too fast speed. Optionally, the blocking application can include a default set of parameters that are initially installed and the default set of parameters can be overridden with the mobile device is paired with an administrator device.

At step 320, the mobile device (e.g., GPS data module 152) can determine whether the velocity of the mobile device exceeds the velocity threshold set by the administrator device.

If the velocity of the mobile device exceeds the velocity threshold, a block mode can be enabled at step 330. Block mode can be enabled by, for example, block mode module 150 as described with respect to FIG. 1. If the velocity of the mobile device does not exceed the velocity threshold, the mobile device can further determine at step 325 whether the velocity has been below the threshold velocity for longer than a threshold disable time value (i.e., idle deactivation time). If not, the process returns to step 320. If so, block mode is disabled at step 335 by, for example, a block mode module such as block mode module 150 as described with respect to FIG. 1.

Figure 4:
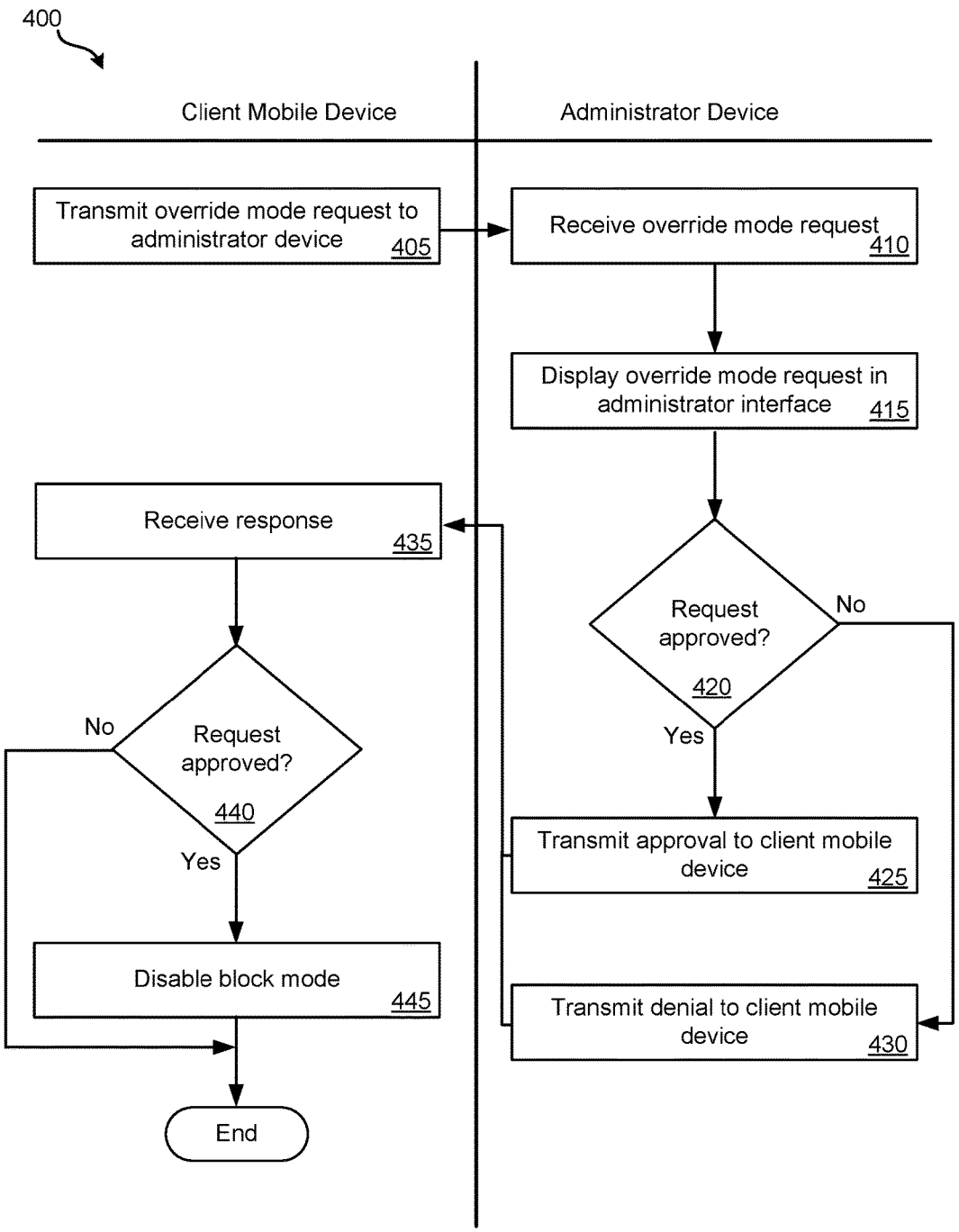

FIG. 4 illustrates a process flow 400 for limiting functionality of a mobile device by an administrator device. Process flow 400 can be performed by, for example, system 100 of FIG. 1. On a client device (e.g., mobile device 105 of FIG. 1) that has block mode enabled, the client device can transmit an override mode request to the administrator device (e.g., administrator device 120 of FIG. 1) at step 405. The override mode request can be sent by, for example, override mode module 144 as described with respect to FIG. 1. The override mode request can be from, for example, the mobile device user that is a passenger in a vehicle rather than the driver. As another example, the override mode request can be from, for example, a mobile device user that is expecting an important phone call and that will otherwise not be using the mobile device while driving. At step 410, the administrator device can receive the override mode request and, at 415, display the override mode request in an administrator user interface. On the administrator device, the override mode request can be received and processed by, for example, override mode module 182 as described with respect to FIG. 1. Optionally, at step 420 the administrator device can determine whether the override mode request was approved or not. As an alternative, at step 420 the administrator device can send the response to the client device without first determining whether it was approved or not. If the override mode request was approved, at 425 an approval can be transmitted to the client device. If the override mode request was denied, at 430 the denial can be transmitted to the client device. Optionally, at step 430 no response is transmitted to the client device if the request is denied. Optionally, if no response is received at step 420 after a threshold period of time (e.g., 5 minutes), the administrator device can transmit a denial to client mobile device at step 430. At step 435, the client device can receive the response. At step 440, the client device can determine whether the request is approved based on the response. If the request is denied, the process flow 400 can end without changing the status of the block mode. Optionally, if no response is received at step 435 after a threshold period of time (e.g., 5 minutes), the client device can end process flow 400 without changing the status of the block mode. If the request is approved, at 445 the client mobile device can disable block mode. Optionally at step 440 the client mobile device can enable an override mode. Optionally, the override mode or the disabling of block mode can be temporary based on a configuration setting provided by the administrator device. For example, the administrator device can provide an override mode time with other configuration settings that sets the override mode period to last temporarily when approved. Optionally, the approval response can include a parameter that sets the override mode time based on the request. For example, a request to quickly call a friend during a long drive to let the friend know when the driver will arrive may be given an override time of 5 minutes. As another example, a request to override because the client device user is a passenger in the vehicle may be given an override time of 30 minutes. Optionally, when the override mode time expires, the override mode can be disabled, returning the client device to block mode. Optionally, if the block mode ends prior to the expiration of the override mode, the override mode can be disabled. Optionally, when the override mode time expires, the client device can be returned to an unblocked state and if the velocity threshold is exceeded by the client device, the blocking application can enable block mode again.

Example Client Device User Interfaces

Figure 5A:
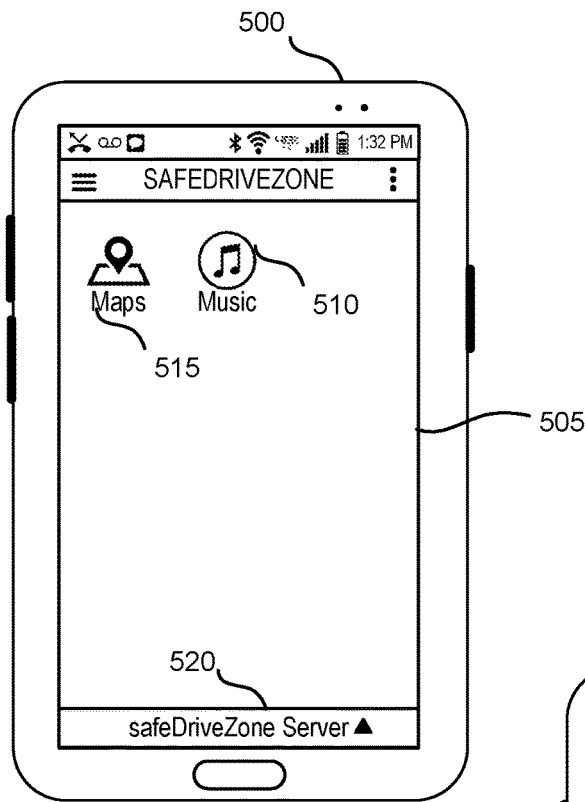
FIG. 5A illustrates a graphical user interface of a client mobile device with block mode enabled according to some embodiments.

FIG. 5A illustrates an example of a client device 500 (e.g., mobile device 105 of FIG. 1). User interface 505 can be provided by the blocking application (e.g. blocking application 142) as the home screen application. The blocking application can enable block mode. As shown in FIG. 5A, with block mode enabled, only the icons 510, 515 for applications on the approved applications list can be displayed. On client device 500, the approved applications list can include the maps application associated with maps application icon 515 and the music application associated with music application icon 510. Selection of maps application icon 515 can launch the maps application. Selection of music application icon 510 can launch the music application. User interface 505 can include server bar 520. Selection of server bar 520 can display a status of the blocking application on client device 500.

Figure 5B:
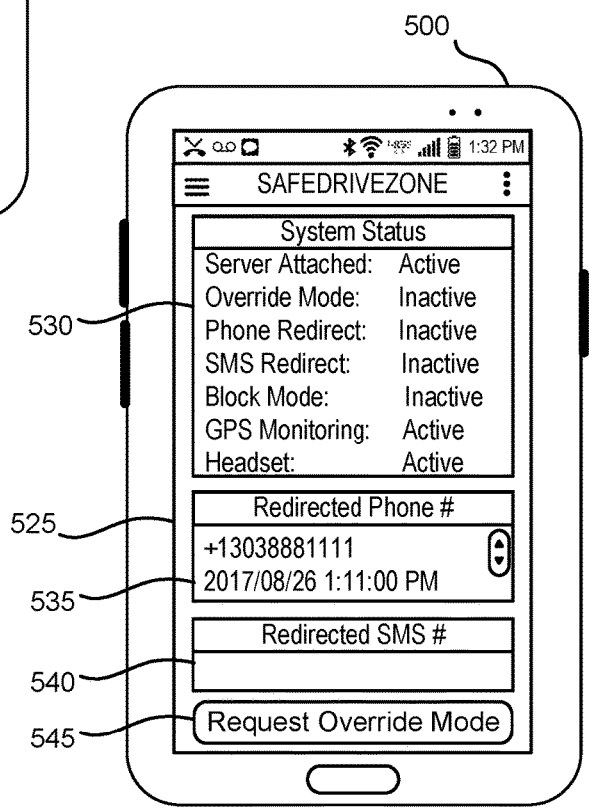
FIG. 5B illustrates a graphical user interface of system information of a client mobile device according to some embodiments.

FIG. 5B illustrates client device 500 with an example user interface 525 displaying the status of the blocking application on client device 500. The user interface 525 can be displayed when server bar 520 is selected in user interface 505. The system status 530 can provide information on the current status of the system. For example, the system status can display a current state (e.g., active or inactive) for settings and modes of the blocking application. The status displayed in 530 can show example values for client device 500 in normal mode (i.e., block mode is not enabled). For example, "server attached" can identify whether the server (e.g., server 110) is attached and all services are functioning properly. A state or status of the server or functionality is indicated by an inactive status of the "server attached." The "override mode" can show as inactive if the override mode is not enabled and active if override mode is enabled. The "phone redirect" can be active if phone redirection is implemented in block mode and block mode is enabled. The "SMS redirect" can be active if texting or messaging redirection is implemented in block mode and block mode is enabled. The "block mode" can indicate active if block mode is enabled and inactive if block mode is not enabled. The "block" mode can indicate whether application blocking is enabled.

The redirected phone number section 535 can provide a list of phone calls that were redirected while client device 500 was in block mode. The list of phone calls in redirected phone number section 535 can be selectable to allow the user of client device 500 to touch and call back the redirected callers once block mode is disabled.

The redirected SMS# section 540 can provide a list of incoming text messages that were redirected while client device 500 was in block mode. The list of redirected messages can be selectable to allow the user of client device 500 to touch the item and see the message and/or respond to the message once block mode is disabled.

The request override mode button 545 can be used to request override mode on client device 500. Selection of the request override mode button 545 can launch a user interface as described in FIG. 7A for requesting override mode.

Figure 6A:
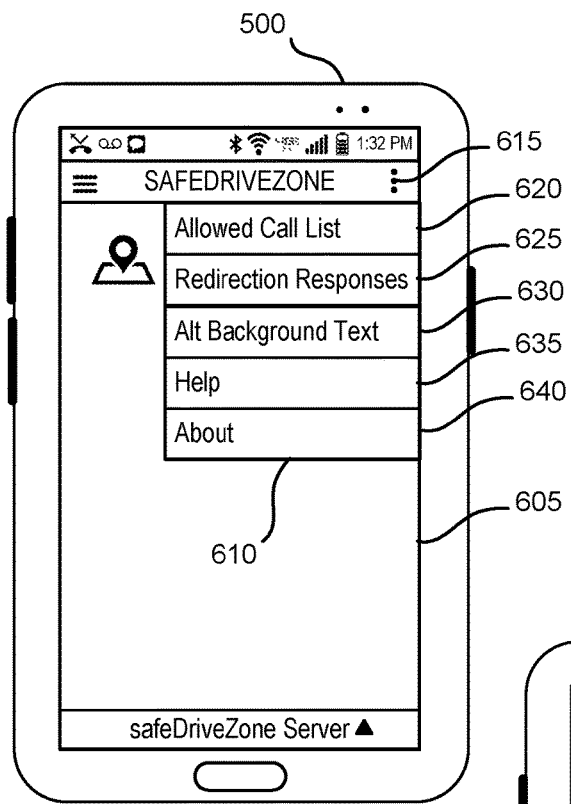
FIGS. 6A, 6B, and 7A illustrate graphical user interfaces of a client mobile device with block mode enabled according to some embodiments.

FIG. 6A illustrates client device 500 with an example user interface 605. User interface 605 can include menu 610. Menu 610 can be opened by selection of menu selector 615. Menu 610 can be the menu displayed in the blocking application when block mode is enabled. Menu 610 can include an allowed call list option 620. Selection of the allowed call list option 620 can launch the user interface 645 described in FIG. 6B. The redirection responses option 625 can launch a user interface that can allow the user of client device 500 to customize the responses sent when a call is redirected and/or when a text message is redirect when the blocking application is in block mode. The alt background text option 630 can launch a user interface for setting the background text while the blocking application is in block mode. The help option 635 can launch a user interface for providing help options to the user of client device 500. The about option 640 can launch a user interface that provides information about the current version of the blocking application including, for example, the version number, the release date, and so forth. Menu 610 can also include other options than those depicted.

Figure 6B:
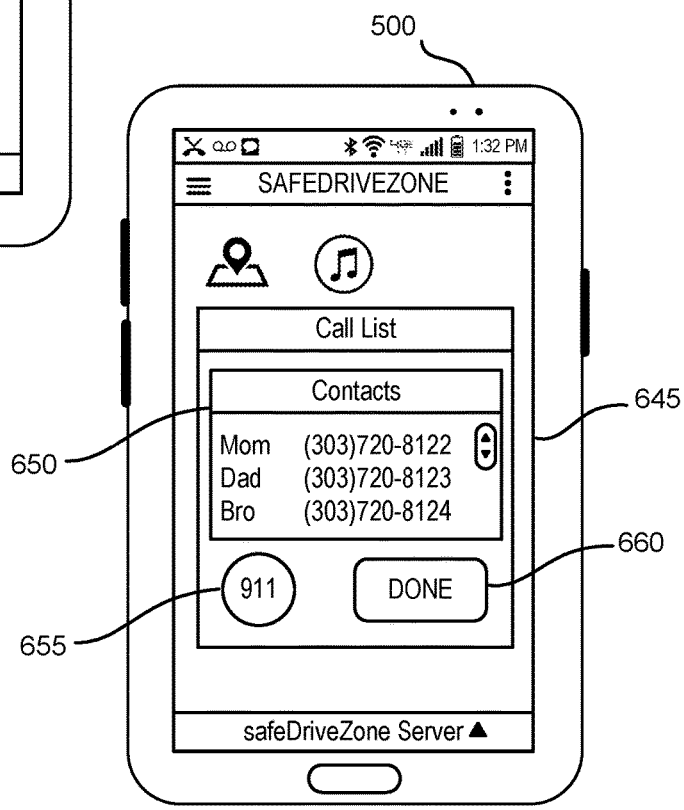

FIG. 6B illustrates client device 500 with an example user interface 645. User interface 645 can be displayed when, for example, the allowed call list option 620 is selected.

Contacts section 650 can include a selectable list of contacts that are on the allowed contact list for client device 500 when block mode is enabled. The 911 button 655 can allow the user of client device 500 to call 911. Generally, calling 911 should never be blocked. Done button 660 can exit user interface 645.

Figure 7A:
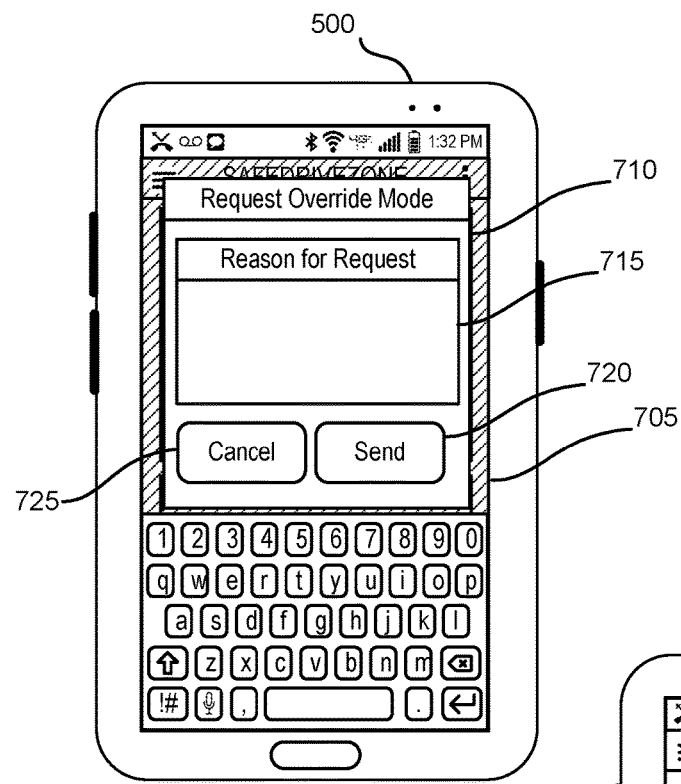

FIG. 7A illustrates client device 500 with an example override mode request user interface 705. Override mode request user interface 705 can be displayed when, for example, override mode request button 545 is selected. Override mode request user interface 705 can include a request override mode interface 710. Request override mode interface 710 can include customized message entry box 715, send button 720, and cancel button 725. The customized message entry box 715 can allow the user to enter a customized message with the override mode request. For example, a customized message that provides the reason for the request can be entered in customized message entry box 715. The cancel button 725 can exit user interface 705. The send button 720 can transmit the request with the message entered in the customized message to the administrator device. The send button 720 can initiate, for example, step 405 as described with respect to FIG. 4.

Figure 7B:
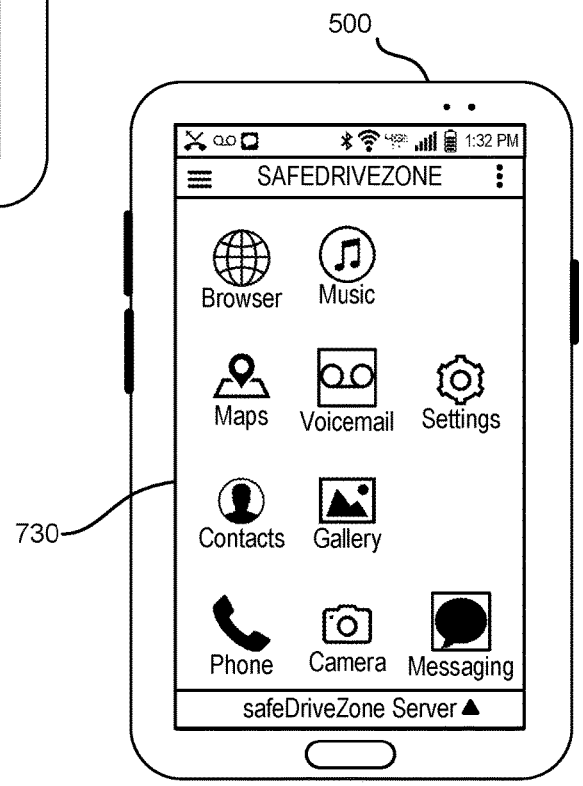
FIG. 7B illustrates an embodiment of a graphical user interface of a client mobile device with block mode disabled according to some embodiments.

FIG. 7B illustrates client device 500 with an example user interface 730 of the home screen with block mode disabled. All installed application icons can be viewable and selectable in user interface 730.

Example Administrator Device User Interfaces

Figure 8:
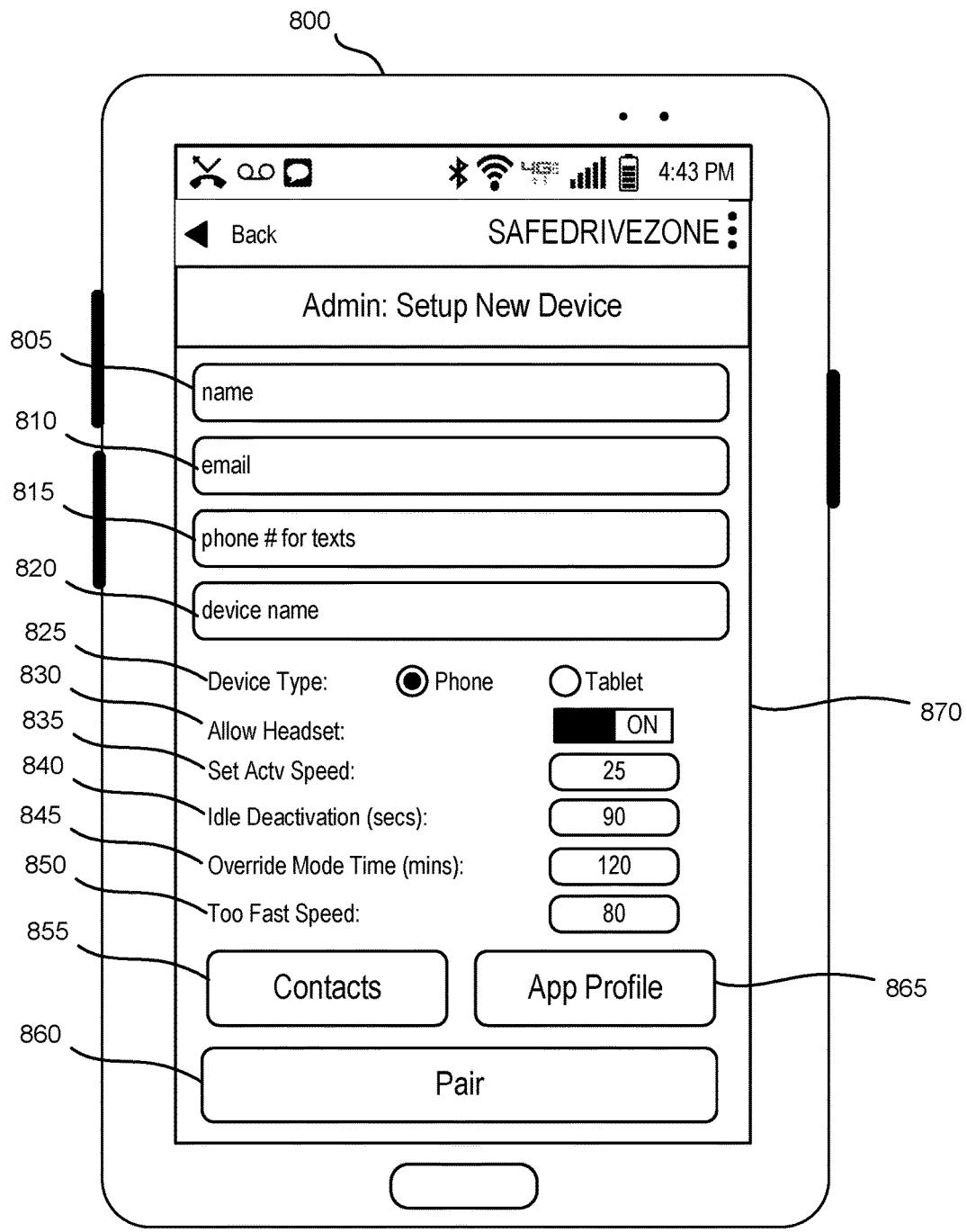
FIGS. 8, 9A, 9B, and 10 illustrate graphical user interfaces of an administrator device for monitoring a client mobile device according to some embodiments.

FIG. 8 illustrates administrator device 800 providing a client device setup user interface 870. The client device setup user interface 870 can allow the administrator to add the client device to the system (e.g., system 100) by providing information about the client device to create a mobile device account. The mobile device account can be created with, for example, a user name 805, an email address 810 for the mobile device user, an SMS number 815 for the mobile device, and a device name 820. Optionally the account can include a device type 825 (e.g., smartphone, tablet, and so forth) that identifies the type of the device. Optionally, the account can include a headset allowed 830 configuration that can allow the user of the client device to receive and make calls to all contacts (instead of only those on the allowed contacts list) while in block mode if a headset (wired or wireless) is attached to the mobile device. Optionally the account can include a threshold velocity value 835 that sets the speed at which mobile device can travel before the block mode is enabled in the blocking application. Optionally, the account can include an idle deactivation value 840 that sets a time for which the mobile device must be travelling below the threshold velocity value before the block mode is disabled. Optionally, the account can include an override mode time 845 that sets a period of time for override mode when it is requested and approved. Optionally, the account can include a too fast velocity 850 that sets a velocity that if mobile device 105 surpasses a notification is provided to the administrator account. Optionally, the account can include an allowed contacts list that specifies contacts that mobile device 105 can access when block mode is enabled. The allowed contacts list can be entered by selecting contacts button 855. Optionally, the account can include an allowed applications list that specifies applications that mobile device 105 can access when block mode is enabled. The allowed applications list can be entered by selecting app profile button 865. The mobile device account information can be received by the administrator device through the user interface 870 and stored on the administrator device. The mobile device account information can be marked for syncing in the administrator device with the backend server (e.g., server 110 and database 115). The pair button 860 can initiate the storage of the account information as well as the pairing of the administrator device with the client device.

Figure 9A:
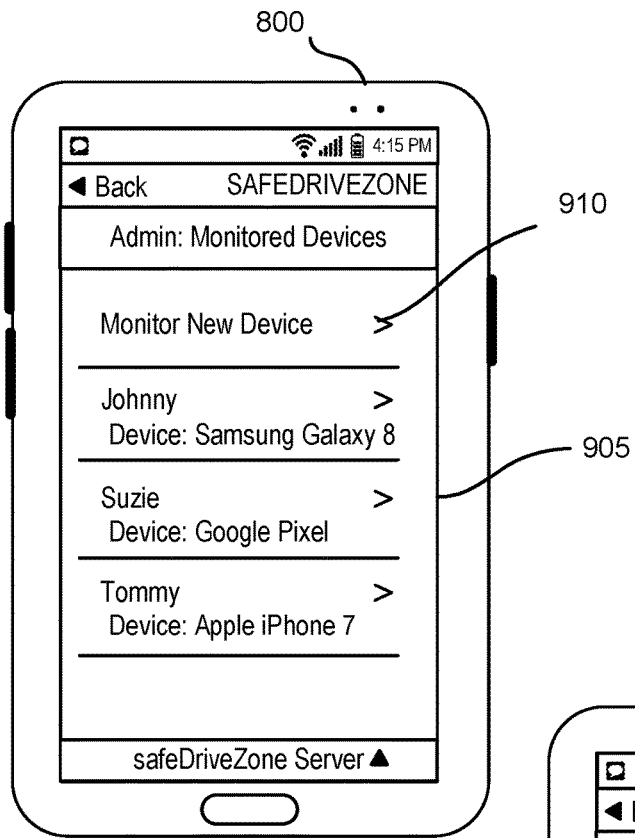
Figure 9B:
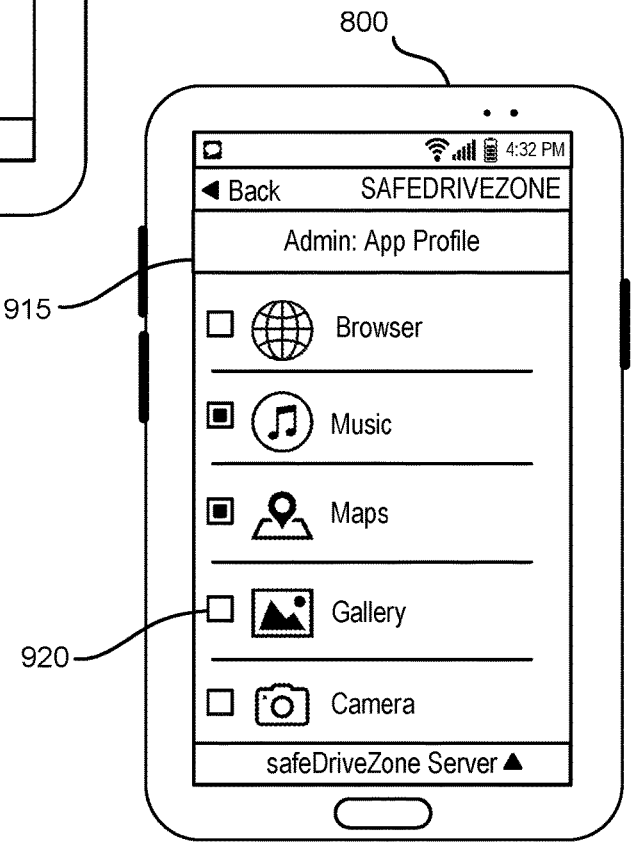

FIG. 9A illustrates administrator device 800 providing a monitored device user interface 905. The monitored device user interface 905 can include a selectable listing of each monitored device (client mobile device) for the currently logged into administrator account and/or for the administrator device 800. The monitored device user interface 905 can include a new device option 910 that can launch, for example, user interface 870 described in FIG. 8 when selected. Selection of any of the monitored devices from the selectable listing can launch, for example, app selection user interface 915.

FIG. 9B illustrates administrator device 800 providing an app selection user interface 915. App selection user interface 915 can include a listing of all installed applications on the selected client device. A selection box 920 can be provided for each installed application that allows the administrator to select the application associated with the selection box 920 to include on the allowed applications list. The listing of installed applications can be provided to the administrator device through the secure, back-end server (e.g., server 110) from the client device. For example, the client device can create a zip file including a listing of each installed application and provide it to the secure, back-end server. The secure, back-end server can provide the zip file (or the information contained within the zip file) to the administrator device. The administrator device can use the zip file to generate the app selection user interface 915. Optionally, if installed applications are added or removed from the client device, an updated installed applications list can be provided by the client device and the administrator device 800 can use the updated list to generate the app selection user interface 915.

FIG. 10 illustrates administrator device 800 providing a monitoring user interface 1005. The monitoring user interface 1005 can include a speedometer 1010 that can display the current velocity of the client device that is being monitored. While this is intended to provide real-time reporting, a delay of approximately 15 seconds can be expected. The current velocity of the client device can be provided by the client device based on, for example GPS data. The monitoring user interface 1005 can also include an odometer reading 1015 that displays the miles driven safely by the client device's user. The miles driven safely can include, for example all miles driven while block mode is enabled on the client device. The idle deactivation counter 1020 can be a countdown timer that can start counting down from the idle deactivation limit when the velocity of the client device falls below the threshold velocity value. The show route button 1025 can launch a mapping display of the route the mobile device has travelled. The tracking toggle 1030 can allow the administrator to not display the odometer and speedometer.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, wellknown circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for limiting functionality of a client mobile device, the method comprising:
    configuring the client mobile device to launch a blocking application as a home screen default application when a home screen button is selected, wherein the configuring comprises setting a home screen default application parameter;
    receiving, from an administrator device, configuration settings comprising:
        a velocity threshold;
        an allowed application list;
        an allowed contact list; and
        a threshold disable time value;
    enabling, on the client mobile device, a block mode in the blocking application in response to determining that a velocity of the client mobile device exceeds a velocity threshold configured by the administrator device, wherein enabling the block mode comprises disabling access on the client mobile device to applications that are not included in the allowed application list configured by the administrator device including, in a user interface of a telephone application on the client mobile device, disabling access to contacts not listed in the allowed contact list;
    determining, by the client mobile device, that the velocity of the client mobile device falls below the velocity threshold for a period of time exceeding the threshold disable time value; and
    in response to determining that the velocity of the client mobile device falls below the velocity threshold for the period of time exceeding the threshold disable time value, disabling the block mode by allowing access to all applications installed on the client mobile device.

2. The method for limiting functionality of a client mobile device of claim 1, the method further comprising:
    pairing the client mobile device to the administrator device using the blocking application.

3. The method for limiting functionality of a client mobile device of claim 1, wherein the velocity is determined based on global positioning system data.

4. The method for limiting functionality of the client mobile device of claim 1, wherein limiting access on the client mobile device to applications that are included in the allowed application list comprises:
    for each application installed on the client mobile device that is not in the allowed application list, making an application icon of the application ineligible for selection in a user interface of the blocking application on the client mobile device.

5. The method for limiting functionality of the client mobile device of claim 1, wherein the block mode further comprises:
    disabling notifications for incoming telephone calls; and
    disabling notifications for each application installed on the client mobile device that is not in the allowed application list.

6. The method for limiting functionality of the client mobile device of claim 1, further comprising:
    configuring a default texting application parameter of the client mobile device to the blocking application, wherein the block mode further comprises:
    intercepting incoming text messages;
    storing the incoming text messages while the block mode is enabled; and
    providing the incoming text messages after the block mode is disabled.

7. A system for limiting functionality of a client mobile device, the system comprising:
    one or more processors; and
    a memory having stored thereon instructions that, when executed by the one or more processors, execute a blocking application configured to:
    configure a home screen default application parameter on the client mobile device to the blocking application, wherein the home screen default application parameter identifies an application to execute by default when a home screen button is selected;
    receive, from an administrator device, configuration settings comprising:
        a velocity threshold;
        an allowed application list;
        an allowed contact list; and
        a threshold disable time value;
    enable a block mode in response to determining that a velocity of the client mobile device exceeds a velocity threshold configured by the administrator device, wherein enabling the block mode comprises disabling access on the client mobile device to applications that are not in the allowed application list configured by the administrator device including, in a user interface of a telephone application on the client mobile device, disable access to contacts not listed in the allowed contact list;
    determine that the velocity of the client mobile device falls below the velocity threshold for a period of time exceeding the threshold disable time value; and
    in response to determining that the velocity of the client mobile device falls below the velocity threshold for the period of time exceeding the threshold disable time value, disable the block mode by allowing access to all applications installed on the client mobile device.

8. The system for limiting functionality of the client mobile device of claim 7, wherein the blocking application is further configured to:
    pair the client mobile device to the administrator device.

9. The system for limiting functionality of the client mobile device of claim 7, wherein the velocity is determined based on global positioning system data.

10. The system for limiting functionality of the client mobile device of claim 7, wherein disabling access on the client mobile device to applications that are not in the allowed application list comprises:
    for each application installed on the client mobile device that is not in the allowed application list, making an application icon of the application ineligible for selection in a user interface of the client mobile device.

11. The system for limiting functionality of the client mobile device of claim 7, wherein the block mode further comprises:
    disabling notifications for incoming telephone calls; and
    disabling notifications for each application installed on the client mobile device that is not in the allowed application list.

12. The system for limiting functionality of the client mobile device of claim 7, wherein the blocking application is further configured to:
    configure a default texting application parameter of the client mobile device to the blocking application, wherein the block mode further comprises:

intercepting incoming text messages;
storing the incoming text messages while the block mode is enabled; and
providing the incoming text messages after the block mode is disabled.

13. The system for limiting functionality of the client mobile device of claim 7, wherein the blocking application is further configured to:
transmit a list of installed applications to the administrator device, wherein the list of installed applications comprises each application installed on the client mobile device; the system further comprising:
an administrator application executed by the administrator device, the administrator application configured to:
receive the list of installed applications;
display the list of installed applications in an administrator user interface;
receive, via the administrator user interface, selection of installed applications to include in the allowed applications list;
generate the allowed applications list based on the selection of installed application to include in the allowed applications list; and
transmit the allowed applications list to the client mobile device.

14. A method, comprising:
receiving, at an administrator device, a request to pair with a client mobile device configured to execute a blocking application;
receiving, at the administrator device after pairing with the client mobile device, a list of installed applications, wherein the list of installed applications comprises each application installed on the client mobile device;
displaying, on the administrator device, the list of installed applications in a user interface of an administrator application on the administrator device;
receiving, by the administrator device via the user interface of the administrator application, selection of installed applications to include in an allowed applications list; and
transmitting, from the administrator device to the client mobile device, configuration settings comprising:
a velocity threshold,
the allowed applications list,
an allowed contact list, and
a threshold disable time value,
wherein the blocking application executing on the client mobile device is configured to:
enable a block mode when a velocity of the client mobile device exceeds the velocity threshold, and wherein when the block mode is enabled access is disabled to applications installed on the client mobile device that are not on the allowed applications list including, in a user interface of a telephone application on the client mobile device, disable access to contacts not listed in the allowed contact list;
determine that the velocity of the client mobile device falls below the velocity threshold for a period of time exceeding the threshold disable time value; and
in response to determining that the velocity of the client mobile device falls below the velocity threshold for the period of time exceeding the threshold disable time value, disable the block mode by allowing access to all applications installed on the client mobile device.

15. The method of claim 14, further comprising:
transmitting a copy of the configuration settings and pairing information between the administrator device and the client mobile device to a secure cloud server.

* * * * *